No. 767,099. PATENTED AUG. 9, 1904.
M. BERTOLETT.
NUT LOCK.
APPLICATION FILED MAR. 26, 1904.
NO MODEL.
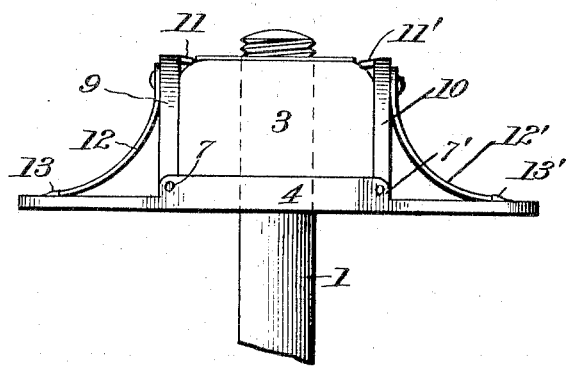
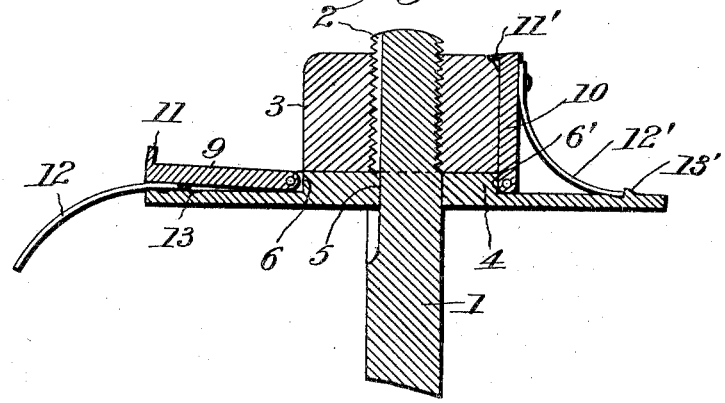
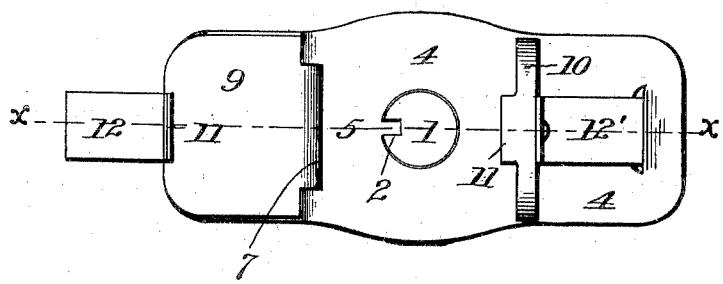
WITNESSES:
C. H. Walker.
A. J. Rapp
INVENTOR
Morris Bertolett
BY
Frank E. Rapp
His Attorney No. 767,099. Patented August 9, 1904.

UNITED STATES PATENT OFFICE.

MORRIS BERTOLETT, OF SCHUYLKILL HAVEN, PENNSYLVANIA.

NUT-LOCK.

SPECIFICATION forming part of Letters Patent No. 767,099, dated August 9, 1904.

Application filed March 26, 1904. Serial No. 200,168. (No model.)

*To all whom it may concern:*

Be it known that I, MORRIS BERTOLETT, a citizen of the United States, residing at Schuylkill Haven, in the county of Schuylkill and State of Pennsylvania, have invented new and useful Improvements in Nut-Locks, of which the following is a specification.

My invention relates to nut-locks, and particularly to that class "washer-tongue held."

The object of the invention is to produce a device which will hold a nut securely locked in one position and prevent its working loose from vibrations or other accidental causes growing out of the use of the device as a nut-lock for rail-joint bolts.

Furthermore, the object of the invention is to produce a nut-lock of the character described which may be used for locking a nut either temporarily or permanently and used upon either metal or wood.

Furthermore, the object of the invention is to provide a nut-lock having means for holding the device from turning on the bolt and provided with spring-locked flaps secured to the base-plate.

Finally, the object of the invention is to produce a nut-lock of the foregoing described type which will possess advantages in points of simplicity, durability, and efficiency, proving at the same time comparatively inexpensive to produce and sustain.

With the foregoing and other objects in view the invention consists in the details of construction and in the arrangement and combination of parts to be hereinafter more fully set forth and claimed.

In describing the invention in detail reference will be had to the accompanying drawings, forming part of the specification, wherein like characters denote corresponding parts in the several views, in which—

Figure 1 is a side elevation. Fig. 2 is a vertical section on the line X X of Fig. 3. Fig. 3 is a plan view.

In the drawings, 1 indicates a bolt provided with a longitudinal groove 2, and 3 the nut, which is adapted to be threaded on the bolt.

The washer-base 4 of my device, which is approximately rectangular in shape, is provided with a central aperture large enough to fit the bolt, and in the periphery of this central aperture a lug 5 is provided, said lug adapted to slide in the groove in the bolt. At a predetermined distance between the aperture and ends of the base-plate shoulders 6 and 6' are formed by reducing the thickness of the base-plate toward the ends. On each side of the shoulder are lugs 7 and 7', having apertures therethrough, and between said lugs I pivot or hinge nut-lock flaps 9 and 10. The nut-lock flaps are provided at their outer ends with small lugs 11 and 11', which extend over the upper surface of the nut when the flaps are in a locked position. Pivoted to the upper outer edge or surface of the nut-lock flaps is a spring 12 and 12'. The lower ends of the spring when the flaps are in a vertical position seat behind a small lug in the base-plate, thereby locking the flaps tight against the surface of the nut and preventing accidental displacement.

To operate my device, the springs are pushed out at their free ends and the nut-lock flaps are allowed to lie horizontally with the base-plate. The base-plate is then adjusted over the bolt with the lug sliding in the groove in the bolt. This groove prevents the washer from turning. The nut is then threaded on the bolt to any desired adjustment, when the nut-lock flaps are raised to a vertical position and the free ends of the springs are seated behind a lug on the base-plate, and it is to be observed that the ends of the springs are held from accidental displacement by a lug formed on the base-plate.

From the foregoing description it is thought that the construction, operation, and advantages will be understood, it being noted that I reserve the right to make changes in the proportions and details of construction within the scope of the invention.

Having fully described my invention, what I claim as new, and desire to secure by Letters Patent, is—

1. In a nut-lock, a base-plate having reduced end portions, and a central portion of approximately twice the thickness of the end portion, the line between the reduced end portions and the central portion forming shoulders, lock-flaps pivoted in said shoulders, means for holding said lock-flaps rigidly against the sides of the nut and means for preventing the rotation of the base-plate substantially as shown and described.

2. In a nut-lock, a base-plate having a shoulder and lugs provided in its upper surface, lock-flaps having lugs formed integral with their upper inner surface pivoted in the shoulders, springs having one end pivoted to the lock-flaps and the opposite ends seating against a lug on the base-plate, means on the base-plate to prevent rotation of the same, as and for the purpose set forth.

3. In a nut-lock of the character described, a base-plate having a lug in its central aperture and a cut-away portion forming shoulders and lugs extending from the shoulders, lock-flaps having lugs on the outer ends, pivoted between the lugs extending from the shoulders, springs having one end pivoted to the lock-flaps and their opposite ends adapted to seat against a lug on the base-plate, means for preventing the rotation of the base-plate, as and for the purpose set forth.

4. In a nut-lock of the character described, a base-plate having a thick central portion provided with an aperture and reduced end portions, the line of demarcation forming shoulders, lugs on each side of the shoulders, lock-flaps pivoted between said lugs, springs having one end pivoted to the upper outer surface of the lock-flaps and their free ends adapted to seat against lugs formed on the base-plate and means for preventing the rotation of the base-plate as and for the purpose set forth.

In testimony whereof I have signed my name to this specification in the presence of two subscribing witnesses.

MORRIS BERTOLETT.

Witnesses:
   N. CARRINGTON,
   A. J. RAPP.